Sept. 18, 1956 J. W. LUDOWICI 2,763,046
WORM PRESSES
Filed June 28, 1952 2 Sheets-Sheet 1

INVENTOR.
Johann Wilhelm Ludowici
BY Michael S. Striker
agt.

Sept. 18, 1956   J. W. LUDOWICI   2,763,046
WORM PRESSES
Filed June 28, 1952   2 Sheets-Sheet 2

INVENTOR.
Johann Wilhelm Ludowici
BY Michael S. Striker
agt

2,763,046
WORM PRESSES

Johann Wilhelm Ludowici, Jockgrim, Pfalz, Germany

Application June 28, 1952, Serial No. 296,203

Claims priority, application Germany March 6, 1952

8 Claims. (Cl. 25—14)

Conventional worm presses for clay or like materials have the disadvantage that the clay pressed forward between the threads of the worm, by the relative movement of the latter in relation to the casing, is disposed in the press head in the form of thinly extruded superimposed layers which produce an undesirable structural formation of the extruded clay. The present invention provides improvements to conventional worm presses.

The improvement forming the subject of the invention consists in the worm being mounted fast on an outer enclosing casing and in the threads of the worm leaving a free space in the middle for the passage of a cylindrical, conical, or like body. The casing with the worm threads preferably remains stationary, while the cylindrical or like central body turns; it may however be advantageous to keep the central body stationary for certain purposes and to rotate the casing carrying the worm threads and an outlet nozzle for the clay. This has the advantage that the extruded clay slides into the nozzle without resistance, thus overcoming the difficulties existing in known presses, namely that the clay must be passed from a rotating part into a stationary nozzle.

When the press is constructed with a stationary worm and stationary casing fixed thereto, the worm is accessible from the outside so that it is possible to act on the clay, for example for the purpose of air-venting. The outer casing with the worm threads may be composed of individual parts, so that in case of need the clay can be extracted at different points. The worm may also be constructed with a plurality of screw threads, in order to obtain higher output.

Figure 1:
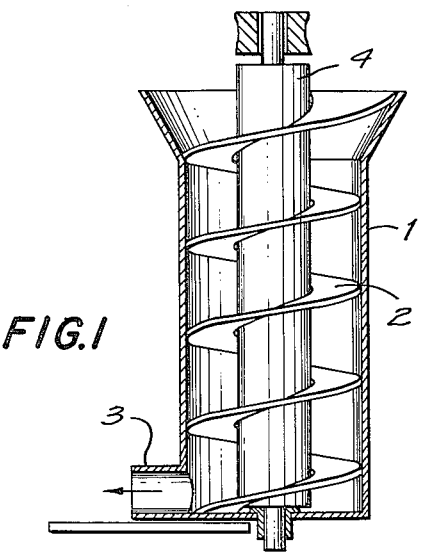
Figure 3:
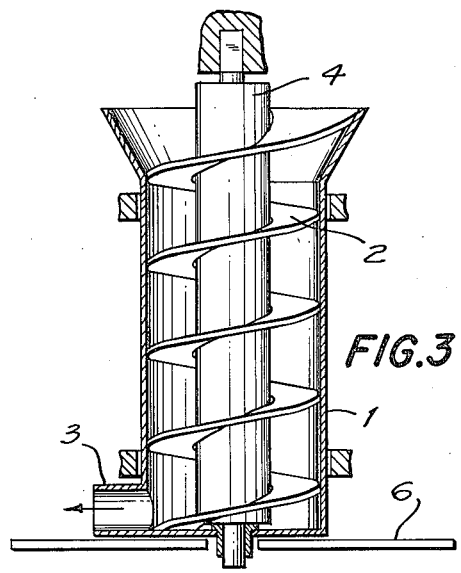
Figure 2:
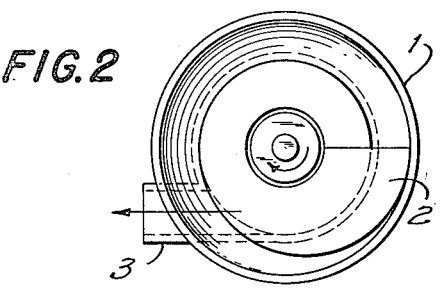
Figure 5:
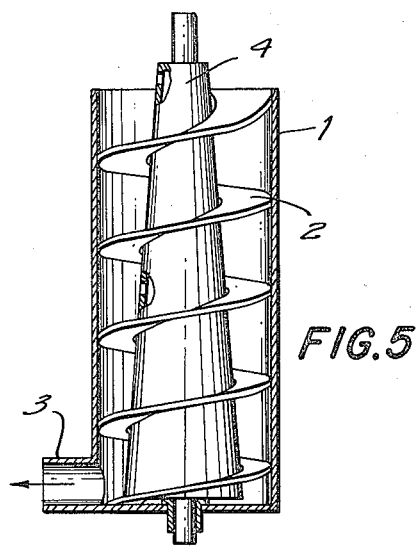
Figure 4:
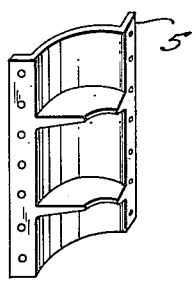
Figure 6:
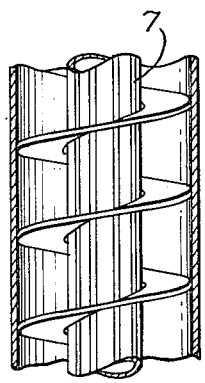
Figure 7:
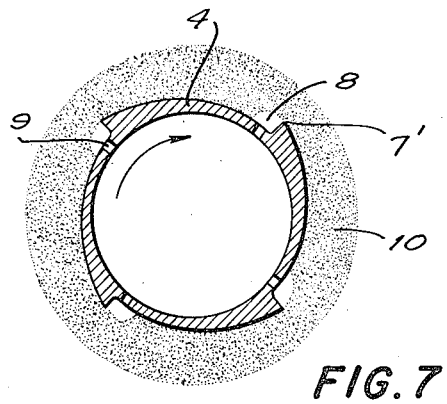
Figure 8:
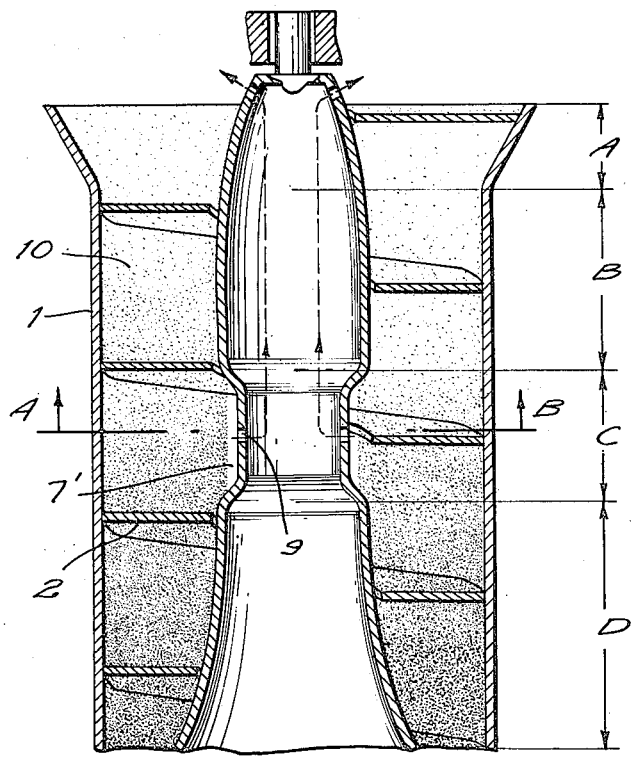

Several embodiments of the invention are illustrated by way of example in the accompanying drawings, in which:

Fig. 1 is a diagrammatic sectional elevation of one form of worm press according to the invention, Fig. 2 is a plan view of the press shown in Fig. 1, Fig. 3 is a view similar to Fig. 1 of a modified form of worm press according to the invention, Fig. 4 is a fragmentary perspective view as will hereinafter appear, Fig. 5 is a view similar to Fig. 1 of a further modified form of worm press according to the invention, Fig. 6 is a fragmentary view, partly in section, of a further modification, Fig. 7 is a sectional view along the line A—B of Fig. 8, and Fig. 8 is a fragmentary view, partly in section, of a further modified form of press according to the invention.

In the drawing, Figures 1 and 2 show the worm threads 2 disposed on the inside of the casing 1 and the nozzle 3 for the outlet of the clay disposed at the bottom. The worm threads leave a free space in the middle in which a central cylindrical body 4 can turn in bearings 11 and 12. The body 4 is driven so that the loose clay introduced into the admission aperture of the press is formed into a length sliding between the worm threads and is pressed, this length being received by the nozzle 3 at the end of the worm without being cut up, as was unavoidable in known constructions.

The outer casing 1, with the worm threads 2, may also be composed of individual parts 5 as shown in Figure 4. The parts may, for example, be made of cast iron and be subsequently provided with a steel coating. The construction of the press from such parts 5 greatly facilitates the cleaning of the press, whereas hitherto this work in clay presses was very time-consuming. Repairs can also be carried out more easily, as individual parts of the casing and worm threads can be removed.

For special purposes, for example when the clay mouldings are ejected on to a circular table, the construction in accordance with Figure 3 may be more advantageous. Here the central body 4 is stationary, while the casing 1 with the worm threads rotates.

In the form of construction illustrated in Figure 5, the central body 4 is conical in shape, so that a gradually increasing compacting of the material is achieved. In the case of the assembly of the casing 1 from identical segments, the same worm pitch can be retained for all segments if a conical central body 4 is used.

In Figures 6 and 7, special constructions of the central body 4 are illustrated. The longitudinal grooves 7, or the ribbed cross-sectional shape of the central body which is illustrated in Figure 7, not only ensure a better grip of the material being pressed but furnish new paths for the venting of air. The edges designated by 7 and 7' have the effect of forming gaps 8 in the material 10 when the body 4 rotates in the clockwise direction, as viewed in Fig. 7, from which gaps the air can escape through apertures 9 into the interior of the tubular body 4, being then withdrawn to the outside. The arrangement may also be such that the gaps 8 are produced in helical lines around the body 4.

It is also within the scope of the invention to effect the above-described air-venting in a restricted part of the press only. This is illustrated, for example, in Figure 8, in which the introduction zone is designated by A, the prepressing zone by B, the air-venting zone by C, and the final pressing zone by D. The venting of air thus takes place only in the zone C, where the parts shown in Figure 7 are disposed.

The new method of air-venting has the advantage that the air forming in the pressed clay is removed immediately before it is enclosed in the clay. The apertures 9 lie protected behind the edges 7' and cannot be stopped up.

I claim:

1. A worm press, comprising, in combination, a tubular casing member having a continuous worm threaded on its inner surface forming within said casing a channel being coaxial with said casing; a shaft member disposed in said tubular casing within said channel and coaxially with said channel, said shaft member having at least one projecting end portion located outside said casing and having an outer diameter being slightly smaller than the diameter of said channel, at least one of said members being mounted for rotation relative to the other; a plurality of longitudinal projections on the outer face of said shaft member located within the space between said outer face and said continuous worm thread so as to be adapted to engage and agitate material passing through said worm press; and air passage means in said shaft member opening at one end in the region of said longitudinal projections and at the other end in said projecting end portion outside said casing, whereby air contained in material passing through said worm press is removed therefrom by said longitudinal projections and forced through said air passage means to pass outside said casing.

2. A worm press, comprising, in combination, a tubular casing member having a continuous worm thread on its inner surface forming within said casing a channel being coaxial with said casing; a tubular shaft member rotatably mounted in said tubular casing within said channel and coaxially with said channel, said shaft member having at least one projecting end portion located outside said casing and having an outer diameter being slightly smaller than the diameter of said channel; a plurality of longitudinal projections on the outer face of said shaft member located within the space between said outer face and said continuous worm thread so as to be adapted to engage and agitate material passing through said worm press; and air passage means in said shaft member opening at one end adjacent to said longitudinal projections and at the other end in said projecting end portion outside said casing, whereby air contained in material passing through said worm press is removed therefrom by said longitudinal projections and forced through said air passage means to pass outside said casing.

3. A worm press, comprising, in combination, a tubular casing member having a continuous worm thread on its inner surface forming within said casing a channel being coaxial with said casing; a fixedly mounted member disposed in said tubular casing within said channel and coaxially with said channel, said shaft member having at least one projecting end portion located outside said casing and having an outer diameter being slightly smaller than the diameter of said channel, said casing member being rotatable about said fixedly mounted shaft member; a plurality of longitudinal projections on the outer face of said shaft member located within the space between said outer face and said continuous worm thread so as to be adapted to engage and agitate material passing through said worm press; and air passage means in said shaft member opening at one end in the region of said longitudinal projections and at the other end in said projecting end portion outside said casing, whereby air contained in material passing through said worm press is removed therefrom by said longitudinal projections and forced through said air passage means to pass outside said casing.

4. Apparatus as claimed in claim 1 wherein said shaft member and said channel are conically shaped.

5. Apparatus as claimed in claim 1 wherein said shaft member has a portion of reduced cross-section, said plurality of longitudinal projections being located only along the portion of reduced cross-section.

6. Apparatus as claimed in claim 1 wherein said longitudinal projections have a pawl-shaped cross-section with the leading edges of said projections being substantially larger than the trailing edges thereof.

7. A worm press, comprising, in combination, a tubular casing member having a continuous worm thread on its inner surface forming within said casing a channel being coaxial with said casing; a tubular shaft member disposed in said tubular casing within said channel and coaxially with said channel, said shaft member having at least one projecting end portion located outside said casing and having an outer diameter being slightly smaller than the diameter of said channel, at least one of said members being mounted for rotation relative to the other; a plurality of longitudinal projections on the outer face of said shaft member located within the space between said outer face and said continuous worm thread so as to be adapted to engage and agitate material passing through said worm press; air inlet means disposed in the surface of said shaft member adjacent said longitudinal projections; and air discharge means disposed in the surface of said projecting end portion of said shaft member, whereby air contained in material passing through said worm press is removed therefrom by said longitudinal projections and forced through said air inlet means through the interior of said shaft member to said air discharge means to pass outside of said casing.

8. A worm press, comprising, in combination, a tubular casing member having a continuous worm thread on its inner surface forming within said casing a channel being coaxial with said casing; a nozzle mounted on said casing member and communicating with the space between two of the threads of said worm and forming a continuation of said worm thread; a shaft member disposed in said tubular casing within said channel and coaxially with said channel, said shaft member having at least one projecting end portion located outside said casing and having an outer diameter being slightly smaller than the diameter of said channel, at least one of said members being mounted for rotation relative to the other; a plurality of longitudinal projections on the outer face of said shaft member located within the space between said outer face and said continuous worm thread so as to be adapted to engage and agitate material passing through said worm press; and air passage means in said shaft member opening at one end in the region of said longitudinal projections and at the other end in said projecting end portion outside said casing, whereby air contained in material passing through said worm press is removed therefrom by said longitudinal projections and forced through said air passage means to pass outside said casing.

References Cited in the file of this patent
UNITED STATES PATENTS

| Number | Name | Date |
|---|---|---|
| 691,155 | Marsky | Jan. 14, 1902 |
| 1,317,243 | Tornsio | Sept. 30, 1919 |
| 1,373,493 | Dye | Apr. 5, 1921 |
| 1,454,213 | Chapman | May 8, 1923 |
| 2,092,522 | Post | Sept. 7, 1937 |
| 2,352,601 | Burke | July 4, 1944 |
| 2,370,434 | Wolf | Feb. 27, 1945 |
| 2,410,131 | Sardeson et al. | Oct. 29, 1946 |
| 2,428,558 | Drucker | Oct. 7, 1947 |
| 2,429,358 | Kamiss | Oct. 21, 1947 |
| 2,502,890 | Ruschmann | Apr. 4, 1950 |
| 2,508,077 | Preston | May 16, 1950 |
| 2,579,287 | Albert | Dec. 18, 1951 |